United States Patent [19]
Cale et al.

[11] Patent Number: 4,900,575
[45] Date of Patent: Feb. 13, 1990

[54] AROMA RECOVERY FROM THE THERMAL HYDROLYSIS OF SPENT GROUNDS

[75] Inventors: Kenneth W. Cale, Marlboro, N.J.;
Naoto Imura, Yokkaichi, Japan;
George A. Jasovsky, Bayonne, N.J.;
Saul N. Katz, Monsey, N.Y.

[73] Assignee: General Foods Corporation, White Plains, N.Y.

[21] Appl. No.: 339,290

[22] Filed: Apr. 17, 1989

[51] Int. Cl.$^4$ .......................... A23F 5/16; A23F 5/48
[52] U.S. Cl. ..................................... 426/387; 426/594; 426/650; 426/386; 426/422; 426/532
[58] Field of Search ............... 426/594, 650, 386, 387, 426/422, 432

[56] References Cited

U.S. PATENT DOCUMENTS

| | | | |
|---|---|---|---|
| 4,508,745 | 2/1985 | Fulger et al. | 426/594 |
| 4,544,567 | 10/1985 | Gottesman | 426/594 |
| 4,571,339 | 2/1986 | Katz et al. | 426/594 X |
| 4,794,010 | 12/1988 | Jones et al. | 426/594 X |
| 4,798,730 | 1/1989 | Scoville et al. | 426/432 |

Primary Examiner—Joseph Golian
Attorney, Agent, or Firm—Thomas A. Marcoux; Thomas R. Savoie; Daniel J. Donovan

[57] ABSTRACT

The present invention relates to a process to recover beneficial coffee volatiles such as diacetyl and acetaldehyde from an aroma stream generated by the thermal hydrolysis of spent grounds. The aroma stream is passed over a bed of a non-polar microporous adsorbent and effluent is collected until breakthrough of furfural is detected. The invention also relates to the composition of the recovered/purified coffee aroma and to soluble coffee products containing the coffee aroma.

12 Claims, No Drawings

AROMA RECOVERY FROM THE THERMAL HYDROLYSIS OF SPENT GROUNDS

TECHNICAL FIELD

The present invention relates to the area of coffee processing, specifically to the recovery and separation of a beneficial coffee flavor rich in diacetyl and acetaldehyde from an aroma containing stream resulting from the thermal hydrolysis of spent grounds.

BACKGROUND ART

The coffee art has over the years strived to capture and separate beneficial coffee aromas and flavors generated during coffee processing. Examples of these aromas include steam aromas, grinder gas aromas, etc. Simultaneously the coffee art has strived to maximize yield in soluble coffee processing by various methods. Initially temperatures and pressures within one or more columns of conventional percolation trains were raised to increase yields. Thereafter the spent grounds were subjected to additional processing conditions such as alkali, acid or high temperature treatments to generate further soluble solids yield. However the instant coffees which result from such high yield processes tend to posses a somewhat harsh, aroma deficient character. There is a need in the art to devise a coffee process which simultaneously generates a high soluble solids yield from roasted and ground and provides a high quality source of beneficial coffee flavor.

DISCLOSURE OF THE INVENTION

The present invention involves a process for the recovery of flavor components containing desirable coffee aromas such as diacetyl and acetaldehyde from an aroma stream generated by the thermal hydrolysis of a partially extracted roasted and ground coffee. The process comprises passing the aroma stream over a bed of non-polar microporous adsorbent which is either a resin or activated carbon and collecting the effluent until breakthrough of furfural occurs. The effluent may be added as is to a coffee product or it may be subject to further fractionation before being added to a coffee product. The invention also describes the unique aroma product which contains greater than 50% acetaldehyde and from 0.2% to 12% diacetyl based upon the total aromatics and describes novel soluble coffee products containing the aroma.

BEST MODE FOR CARRYING OUT THE INVENTION

The present invention discloses a process which purifies an aroma stream which is generated by the thermal hydrolysis of a partially extracted roasted and ground coffee. The aroma stream which is purified may be produced by any high temperature relatively short time reaction of spent coffee grounds which produces coffee volatiles which can include Maillard and browning reactions. A preferred process for generating the aroma stream is disclosed in a commonly-assigned patent application Ser. No. 244,205 filed Sept. 14, 1988 which is entitled A Process For Hydrolyzing A Partially Extracted Roasted And Ground Coffee which is herein incorporated by reference. As is stated in the referenced application, the preferred partially extracted roasted and ground coffee is one which has been subjected to atmospheric extraction and has had a majority of the arabinogalactan extracted therefrom prior to being thermally hydrolyzed. The thermal hydrolysis conditions can be briefly described as follows: a slurry of from 2% to 75% solids is subjected to temperatures of from about 200° C. to about 260° C. for a period of time ranging from about 1 minutes to about 15 minutes in a reactor, preferably a tubular plug flow reactor. The aroma stream from this specific process exits the plug flow reactor as a flash condensate. The flash condensate contains significant amounts of desirable coffee aromas but this aroma source cannot be used without purification/separation due to an intense off-flavor (termed "thermal" as discussed herein). The flash condensate contains significant amounts of diacetyl and other light compounds such as acetaldehyde, IBA (2-methyl propanal), IVA (3-methyl butanal), 2-3 pentanedione, etc. The condensate also contains a strong undesirable note which is believed to be attributable to the presence of N-Heterocyclic compounds. In the commercial application of this purification/separation treatment it is desirable to reduce the volume of the condensate aroma stream. It is therefore preferred to concentrate this specific aroma stream 10 to 40 fold such as may be accomplished by using a still or evaporator to achieve an aroma concentration in the range of from 10,000 to 40,000 ppm.

After the aroma stream has been collected and optionally concentrated, the stream is passed over a bed of a non-polar microporous adsorbent. Preferred adsorbents are non-polar resins with the polymers of styrene and divinyl benzene being the most preferred resins. Also preferred as an adsorbent are activated carbons possessing the following characteristics: high surface area and large pore volume as per 12 x 40 mesh size, 1,000-1,100 $m^2$/g surface area, 0.90 cc/g pore 4 volume and a pore diameter within the range of from 10 to 1,000 Å. The resin should possess a surface area within the range of from 800 to 1,000 $m^2$/g and a pore diameter within the range of from 20 to 150 Å. Selection of a specific adsorbent meeting the above criteria depends upon parameters such as processing rate, material balance, i.e., resins with larger surface area have more capacity for adsorption and as a result higher percentages of diacetyl and acetaldehyde are recoverable before breakthrough of furfural occurs.

The adsorbent bed may be arranged in numerous ways as may be apparent to one skilled in the art. The preferred method is to pack the adsorbent into a column. Prior to passing the aroma stream through the column the adsorbent is backwashed with water to eliminate any air bubbles present within the column. The effluent is collected up to the time that breakthrough of furfural takes place. It may be preferred to discard the first 1 to 3 bed weight portions of the effluent because this represents primarily water. Breakthrough can be determined by isolating the effluent coming off the column and subjecting the effluent to chemical analysis to determine the presence of furfural. As an alternative it is possible to monitor the odor of the effluent. The effluent will progress through distinct periods where the odor proceeds from a fruity/winey character to a buttery character and finally to an intense off-flavor which is termed "thermal" character which is defined as an objectionable green, musty, dill-like, cereal-like, non-coffee character. The effluent is collected until the "thermal" character is detected. After breakthrough, typically all liquid in the column is drained from the column and discarded or recycled. The adsorbent is then backwashed and regenerated by methods familiar to those skilled in the art.

The effluent containing the diacetyl and acetaldehyde is useful as a flavor/aroma enhancer. Typically the finished aroma will contain total aromatics of greater than 200 PPm, preferably in the range of from 2,000 to 12,000 ppm depending upon the concentration of the feed, the latter range corresponds to a 20 to 30% recovery of total aromatics from the starting aroma stream (preferably the flash condensate from thermal hydrolysis of spent grounds). Of the total aromatics present in the effluent, acetaldehyde is the major component making up greater than 50% of the aromatics, typically from 60 to 90%. The effluent also contains a significant quantity of diacetyl, typically within the range of from 0.2% to 12.0% of the total aromatics, preferably from 2.5% to 7.5%. The remainder of the aromatics include compounds such as acetone, IBA, IVA, 2,3-pentanedione and may contain a small amount of furfural. The finished aroma product will contain a combined amount of acetaldehyde and diacetyl which represent greater than 51% of the total aromatics ((acetaldehyde +diacetyl)/total aromatics), preferably greater than 61.0%. Additionally the combination of acetaldehyde and diacetyl compared to the amount of IVA ((acetaldehyde +diacetyl)/IVA) is greater than 25, preferably from 125 to 1,000. The ratio of acetaldehyde to IVA (acetaldehyde/IVA) is greater than 20 preferably from 125 to 1,000. The ratio of diacetyl to IVA (diacetyl/IVA) is greater than 2.0. The amount of acetaldehyde in the aroma product will be greater than 100 ppm, preferably greater than 1,000 ppm and the amount of diacetyl will be greater than 5 ppm, preferably greater than 50 ppm.

It is important to understand why in the characterization of the purified aroma and soluble coffee products containing the aroma, the significance of the comparison ratio of the important flavor constituents, diacetyl and acetaldehyde, to IVA is highlighted. Simply stated, these ratios show the unique aroma which heretofore has not been able to be produced by methods known to those skilled in the art. These ratios also shows the uniqueness of the separation which is accomplished by the present inventive process.

Reducing sugars in coffee, such as mannose, react with a nitrogen source in the presence of heat (via a Maillard reaction or browning reaction) to form diketones (such as diacetyl). These diketones undergo further chemical reaction with amino acids (known as Strecker Degradation) to form aldehydes such as acetaldehyde, IBA, IVA, 2 Me-Butanal and other nitrogen containing aromas. Additional information on these types of reactions can be found in Vernin, G. (editor) *Chemistry of Heterocyclic Flavoring And Aroma Compounds*, Ellis Horwood Ltd., England, 1982 (p. 152-158). The present process produces a unique flavor by isolating the acetaldehyde and diacetyl from deleterious coffee volatiles to produce the novel aroma.

The effluent may be added to a coffee product or an imitation coffee-type product as a flavor/aroma enhancer to enhance or augment a fruity/winey and a buttery flavor. The effluent solution containing acetaldehyde and diacetyl could be added as is to roast and ground coffee, brown extract or it could be added to a spray-dried or freeze-dried instant coffee.

The utilization of this invention has its most important application to soluble coffee processing. After the flavor is recovered, it may be added at any convenient step in the soluble coffee process such as plating the dry soluble coffee or coffee substitute with the flavor agent in a solution followed by drying. In certain instances the flavor solution may be added directly to a concentrated coffee extract and the mixture spray-dried or freeze-dried into a soluble coffee product which contains the flavor agents, most prominently acetaldehyde and diacetyl as an intrinsic part thereof. In such a freeze-dried or spray-dried instant coffee, the aroma produced by the process of the present invention may be added as the sole aroma component or it may by added in combination with other aroma sources, i.e., grinder gas, steam aromas, aromas stripped from the concentration of coffee extract, etc. In either event, the incorporation of the present aroma into an instant coffee will yield a novel soluble coffee product possessing a level of acetaldehyde greater than 15 ppm, preferably within the range of from 25 PPm to 125 ppm, a level of diacetyl greater than 5 ppm, preferably within the range of from 10 ppm to 40 ppm, and an amount of total volatiles greater than 175 ppm preferably within the range of from 300 ppm to 800 ppm. Importantly the soluble coffee product will contain a combined level of acetaldehyde and diacetyl compared to IVA ((acetaldehyde +diacetyl)/IVA) of greater than 1.5, preferably from 1.75 to 10 and a ratio of acetaldehyde to IVA (acetaldehyde/IVA) of greater than 1.0 preferably from 1.5 to 10.

In a most preferred embodiment of the present invention, the aroma is added to an extract produced by the atmospheric extraction of roast and ground coffee combined with the thermal hydrolysis of the partially extracted roast and ground coffee (as taught in the aforementioned commonly-assigned patent application, Ser. No. 244,205 filed Sept. 14, 1988). In this situation, the soluble coffee product which results from the addition of the present aroma to the soluble solids will produce an instant coffee product (spray-dried or freeze-dried) which will contain the levels and ratios of aroma previously set forth and the coffee product will additionally contain an amount of mannose and mannan oligomers of 15% or more resulting from the thermal hydrolysis of the mannan fraction. Additionally, the percentage yield on a roast and ground coffee, dry basis, will range from 55% to 73%, preferably from 65% to 73%.

The flavor agent may also be added to roast and ground coffee to augment a fruity/winey and a buttery flavor note.

Alternatively, the effluent may be further separated to produce a purified diacetyl or acetaldehyde which may be added as a natural flavor agent to a wide variety of food and beverage products.

The following Examples illustrate certain embodiments of the present invention. The Examples are not meant to limit the invention beyond what is claimed below.

EXAMPLE 1

Three pilot plant runs were conducted to purify the aroma stream (the flash condensate) produced by thermal hydrolysis of spent coffee grounds. The spent coffee grounds had been extracted until a 43% Yield (dry basis, starting roast and ground coffee) was achieved. In accordance with the teachings of copending, commonly-assigned patent application Ser. No. 07/244,205 previously cited and discussed, the spent grounds in a 10% slurry were exposed to a temperature of 430° F. for 8 minutes in a plug flow reactor.

The flash condensate from this reaction was concentrated by 20 to 30-fold and then treated by the present inventive process. The composition of the concentrated flash condensate is shown in Table II for each of the three runs under the column entitled "Feed". Runs 1 and 3 utilized a commercially available non-polar polystyrene divinylbenzene resin (Bio-Rad SM-4) and Run 2 utilized a granular activated carbon (Calgon type CPG) as the adsorbent.

Each run was conducted in a single glass column measuring 4" in diameter by 7' high. The resin or carbon was pre-weighed and added to the column from above in slurry form. The adsorbent was backwashed for one hour to elevate the fine mesh particles to the top of the bed. The bed was then allowed to settle with the water level 6" above the adsorbent. The feed was added to the adsorbent columns via downflow at a prescribed flow rate. A liquid level of approximately 1 foot above the adsorbent was maintained throughout the run. The first 2-4 bed weights of effluent obtained during start-up were discarded as being primarily the water hold-up within and above the adsorbent bed. Chromatographic analysis confirmed the extremely dilute nature of this initial draw-off. The operating conditions are set forth in greater detail in Table I.

TABLE I

| OPERATING CONDITIONS | | | |
|---|---|---|---|
| | Run 1 | Run 2 | Run 3 |
| Adsorbent | | | |
| Type: | Bio-Rad SM-4 Resin | Calgon CPG Carbon | Bio-Rad SM-4 Resin |
| Weight (lbs) | 10 | 5 | 10 |
| Mesh size: | (−20, +50) | (−12, +40) | (−20, +50) |
| Adsorbent Bed | | | |
| Diameter (in.): | 4 | 4 | 4 |
| Height (ft): | 2.5 | 2.0 | 2.5 |
| L/D: | 7.5 | 6.0 | 7.5 |
| Operating Temperature (°F.): | 68 | 72 | 78 |
| Feed Rate | | | |
| (lbs/hr): | 5.2 | 5.2 | 5.2 |
| (cc/min): | 39 | 39 | 39 |
| Superficial Velocity (ft/hr) | 0.96 | 0.96 | 0.96 |
| Aroma Residence Time (hrs) | 2.6 | 2.1 | 2.6 |
| Operating Time (hrs) | 22 | 30 | 27 |
| Effluent Discarded | | | |
| beds wts. | 2 | 2 | 2 |
| lbs. | 20 | 10 | 20 |
| Effluent Collected | | | |
| beds wts. | 9.5 | 29 | 12 |
| lbs. | 95 | 145 | 120 |
| Product (based on "breakthrough") | | | |
| bed wts. | 3-10 | 3-16 | 3-10 |
| lbs. | 80 | 70.5 | 80 |

Within the first half-hour of resin column operation, the beginnings of a yellow colored band appears at the top of the resin bed. This yellow band (believed to be the diacetyl fraction of the feed stream) gradually moves down the column at a rate of approximately 2" per hour, spreading out as it proceeds—to an ultimate bank width of 6 to 8 inches by the time it reaches the bottom of the resin bed. The movement of this band coincides closely with the 20 hours expended while collecting the desirable aroma fraction before reaching breakthrough The breakthrough point for each run was determined by sniffing effluent aliquots, one bed weight at a time. During the course of each run, effluent character moved from "fruity" (bed weights 2-6 for resins; 4-12 for carbon) to "buttery" (bed weights 7-10 for resins; bed weights 12-16 for carbon) to "thermal". Breakthrough occurs when the thermal character first appears, at which point useful product ceases to be collected.

Each resin run produced 80 lbs of a buttery/fruity aroma fraction. These products represented the 3 to 10 bed weight portion of the run that was collected prior to "breakthrough". The first two bed weights (20 lbs) were discarded as they were primarily water. Breakthrough was determined organoleptically and later confirmed by gas chromatography.

The carbon run produced 70.5 lbs of aroma having similar character but slightly less impact. This aroma represented the 3 to 16 bed weight portion of the run (a carbon "bed weight" is equivalent to 5 lbs of adsorbent vs. 10 lbs of resin since the latter is 50% water).

Although total organics and acetaldehyde recoveries from all three runs were similar, diacetyl recoveries varied from 25% (carbon) to 38 and 48% in the two resin runs. This can be explained by having arbitrarily taken "breakthrough" further out during the product collection than was done with carbon.

At the conclusion of the run, all liquid was drained from the column and discarded. The adsorbent was backwashed and discharged from the bottom of the column in slurry form.

TABLE II

| FEED & PRODUCT COMPOSITIONS | | | | | | |
|---|---|---|---|---|---|---|
| | Run 1 | | Run 2 | | Run 3 | |
| | Feed | Product | Feed | Product | Feed | Product |
| Total Aromatics (ppm) | 31,200 | 8,220 | 38,100 | 9,230 | 21,900 | 6,100 |
| Selected Flavor Components | | | | | | |
| Acetaldehyde | 8,417 | 6,480 | 9,737 | 7,451 | 6,415 | 5,150 |
| IBA | 1,432 | 21 | 1,669 | 47 | 919 | 1 |
| IVA | 3,325 | 2 | 3,819 | 29 | 2,292 | 3 |
| 2-ME Butanal | 1,150 | 0 | 1,302 | 0 | 735 | 1 |
| Furan | 6 | 0 | 7 | 0 | 3 | 0 |
| 2-ME Furan | 6 | 0 | 5 | 0 | 4 | 0 |
| Diacetyl | 934 | 449 | 1,203 | 284 | 570 | 219 |
| 2, 3 Pentadione | 313 | 10 | 430 | 1 | 188 | 2 |
| Furfural | 8,863 | 46 | 11,274 | 4 | 5,954 | 8 |
| Total Nitrogenous Compounds | 156 | 25 | 201 | 0 | 75 | 4 |
| Total Organics Recovery | — | 26% | — | 24% | — | 28% |

TABLE II-continued

| | FEED & PRODUCT COMPOSITIONS | | | | | |
|---|---|---|---|---|---|---|
| | Run 1 | | Run 2 | | Run 3 | |
| | Feed | Product | Feed | Product | Feed | Product |
| Acetaldehyde Recovery | — | 77% | — | 76% | — | 80% |
| Diacetyl Recovery | — | 48% | — | 24% | — | 38% |

Analysis of feed and product samples were made by 3-detector direct inject gas chromatography (all values being standardized by response of 4-methyl-thiazole). The values reported in Table II for furfural in the feed (flash condensate) would correspond to those values reported in the aforementioned commonly-assigned patent application Ser. No. 244,205 filed Sept. 14, 1988 which values are a percentage of the total aromatics present in the slurry prior to flash. Although feed concentrations varied somewhat for each run, feed composition changed very little (Table I). A comparison of product compositions (Table II) shows only small differences in total organics and acetaldehyde recoveries as a percentage of the feed composition, but very significant differences in diacetyl recoveries.

The aroma products from each run were added to coffee extract prior to spray-drying at a level of 0.07 g aroma/g coffee solids for organoleptic evaluation. As compared to a control instant coffee, the instant coffee which had incorporated therein the aroma product produced by the present invention was perceived by a trained taste panel to possess a smoother, buttery flavor.

EXAMPLE 2

Two separate experimental runs were conducted producing spray-dried coffee products which were analyzed and compared to a cross section of commercially available spray-dried and freeze-dried soluble coffee products. All runs were conducted according to the process set forth in Example 1. Run #1 utilized a resin as the adsorbent, while Run #2 utilized activated carbon (See Example 1 for adsorbent details). Run #1 incorporated the purified aroma as the sole aroma which was added to a soluble coffee extract at 0.07 lbs. aroma per lb. of soluble solids (or alternatively 0.117 lbs. of finished aroma was produced per lb. of starting roast and ground coffee). Run #2 incorporated the finished aroma at a level of 0.052 lbs. aroma per lb. of soluble solids in combination with 0.14 lbs. of aroma per lb. soluble solids of an aroma stripped from the concentration of the coffee extract (concentration prior to spray-drying). Table III(C) contains the analytical results of tests conducted on spray-dried products incorporating the aromas produced in Runs 1 and 2; Table III(A) contains the analytical results of tests conducted on commercially-available freeze-dried coffee products.

The volatile aroma results are obtained by using 3-detector Purge and Trap Gas Chromatography (all values being standardized by response of 4-methyl-thiazole). Mannose results are obtained by hydrolyzing mannans in the soluble product to mannose by using sulfuric acid and then analyzing by using Dionex ion chromatography with pulse amperometric detection.

TABLE III(A)

| COMMERCIALLY-AVAILABLE SPRAY DRIED COFFEE PRODUCTS | | | |
|---|---|---|---|
| | Agg. Maxwell House | Folger's Crystals | Nescafe Classic |
| Total volatiles (ppm) | 313 | 480 | 242 |
| Acetaldehyde (ppm) | 15 | 22 | 8 |
| IBA | 28 | 34 | 10 |
| IVA | 30 | 47 | 15 |
| 2 ME Butanal | 34 | 35 | 15 |
| Furan | 0.5 | 0.5 | 0.6 |
| 2 Me. Furan | 3.2 | 1.4 | 1.1 |
| Diacetyl | 5 | 8 | 4 |
| 2,3 Pentanedione | 6 | 5 | 4 |
| Furfural | 31 | 103 | 15 |
| Total Nitrogen Cmpds. | 9 | 16 | 17 |
| $\dfrac{\text{Acetaldehyle + Diacetyl}}{\text{IVA}}$ | 0.67 | 0.64 | 0.8 |
| $\dfrac{\text{Acetaldehyde}}{\text{IVA}}$ | 0.5 | 0.47 | 0.53 |
| Mannose (%, dry basis) | 8.53 | 8.26 | 10.92 |

TABLE III(B)

| COMMERCIALLY-AVAILABLE FREEZE DRIED COFFEE PRODUCTS | | | | | |
|---|---|---|---|---|---|
| | Tasters Choice | Tasters Choice Select | AGF Maxim | Unser Bester | Nescafe Ambience |
| Total volatiles (ppm) | 392 | 422 | 802 | 670 | 586 |
| Acetaldehyde (ppm) | 17 | 20 | 32 | 20 | 28 |
| IBA | 22 | 35 | 45 | 32 | 44 |
| IVA | 25 | 36 | 44 | 44 | 45 |
| 2 ME Butanal | 31 | 43 | 48 | 46 | 58 |
| Furan | 1.8 | 2.9 | 2.9 | 3 | 3 |
| 2 Me. Furan | 3.8 | 4.4 | 6.9 | 6 | 5 |
| Diacetyl | 15 | 16 | 15 | 22 | 21 |
| 2,3 Pentanedione | 21 | 25 | 16 | 32 | 40 |
| Furfural | 42 | 39 | 65 | 42 | 44 |
| Total Nitrogen Cmpds. | 22 | 10 | 62 | 35 | — |
| $\dfrac{\text{Acetaldehyle + Diacetyl}}{\text{IVA}}$ | 1.28 | 1.0 | 1.07 | 1.0 | 1.09 |
| $\dfrac{\text{Acetaldehyde}}{\text{IVA}}$ | 0.68 | 0.56 | 0.73 | 0.45 | 0.62 |

TABLE III(B)-continued
COMMERCIALLY-AVAILABLE FREEZE DRIED COFFEE PRODUCTS

|  | Tasters Choice | Tasters Choice Select | AGF Maxim | Unser Bester | Nescafe Ambience |
|---|---|---|---|---|---|
| Mannose (%, dry basis) | 11.23 | 12.26 | 10.90 | — | 7.10 |

TABLE III(C)

| | PRESENT INVENTION (Spray Dried) | |
|---|---|---|
| | Run #1 | Run #2 |
| Total volatiles (ppm) | 345 | 631 |
| Acetaldehyde (ppm) | 80 | 99 |
| IBA | 15 | 28 |
| IVA | 10 | 34 |
| 2 ME Butanal | 4 | 36 |
| Furan | 0.9 | 0.9 |
| 2 Me. Furan | 0.6 | 1.0 |
| Diacetyl | 17 | 16 |
| 2,3 Pentanedione | 2 | 15 |
| Furfural | 4 | 62 |
| Total Nitrogen Cmpds. | 4 | — |
| $\frac{\text{Acetaldehyde + Diacetyl}}{\text{IVA}}$ | 9.7 | 3.38 |
| $\frac{\text{Acetaldehyde}}{\text{IVA}}$ | 8.0 | 2.91 |
| Mannose (%, dry basis) | 17.0 | 16.2 |
| Yield (R & G, dry basis) | 64.5 | 59.3 |
| Flavor | All possessed a smooth, mild, slightly buttery character. | |

By way of comparison, a finished aroma produced by the present invention was analyzed (aroma alone) and was found to contain a ratio of ((acetaldehyde +diacetyl)/IVA) of 261, a ratio of (acetaldehyde/IVA) of 257.5, a ratio of (diacetyl/IVA) of 3.5, a ratio of acetaldehyde +diacetyl/total aromatics of 82%, and an acetaldehyde level of 7,357 ppm, diacetyl level of 101 ppm and total aromatics level of 9,128 ppm.

EXAMPLE 3

In a similar manner as described in Example 1 a purified aroma was produced according to the process of the present invention. In order to vividly point out the extremely large amount of beneficial aromas which are produced by the present process, the aroma content of one hundred pounds of a 50% Arabica, 50% Robusta blend of a 45 roast color, roast and ground coffee was measured and after each successive treatment, the product was also analyzed and the results reported in Table IV below. The first column marked "R&G" sets forth the amount of the aromas (in pounds) which exist in the roast and ground coffee. Thereafter the one hundred pounds of roast and ground coffee was extracted to a Yield of 43% roasted and ground, dry basis. The extract was analyzed for the presence of aroma and these numbers are reported in the second column marked "Extract". The spent grounds were analyzed and found to be void of the reported aromas. Thereafter the spent grounds were thermally hydrolyzed as set forth in Example I to produce a thermal flash which contained the aroma profile indicated in the fourth column marked "Thermal Flash". The next processing step involved a concentration step which produced a thermal distillate which is essentially similar to the composition of the thermal flash when experimental error with the analytical technique is discounted. The last step involves the purification/separation step of passing the concentrated aroma over a resin bed to produce a purified aroma having the composition as set forth in the last column.

TABLE IV

| | 100 lbs. R & G | Extract | Spent Grounds | Thermal Flash | Thermal Distillate | Purified Aroma |
|---|---|---|---|---|---|---|
| Total Volatiles (lbs.) | 0.1560 | 0.2045 | 0 | 0.4039 | 0.3594 | 0.0835 |
| Acetaldehyde (lbs.) | 0.0025 | 0.0125 | 0 | 0.0687 | 0.0734 | 0.0442 |
| Diacetyl (lbs.) | 0.0033 | 0.0055 | 0 | 0.0138 | 0.0132 | 0.0083 |
| IVA (lbs.) | 0.0078 | 0.0077 | 0 | 0.1006 | 0.0851 | 0.0003 |
| Furfural (lbs.) | 0.0055 | 0.0435 | 0 | 0.0258 | 0.0250 | 0 |

We claim:

1. A process for the recovery of aromatic components from an aroma stream generated by thermal hydrolysis of a partially extracted roasted and ground coffee which comprises:
    passing the aroma stream as a condensate over a bed of non-polar microporous adsorbent, and
    collecting the effluent until breakthrough of furfural occurs.

2. The process of claim 1 further comprising adding the collected effluent to a coffee product.

3. The process of claim 2 further comprising regenerating the non-polar microporous adsorbent.

4. The process of claim 1 wherein the partially extracted roasted and ground coffee has been subjected to atmospheric extraction and has a majority of the arabinogalactan extracted therefrom prior to thermal hydrolysis.

5. The process of claim 4 wherein the partially extracted roasted and ground coffee has been thermally hydrolyzed by a process wherein a slurry of said coffee is subjected to a temperature of from about 200° C. to about 260° C. for a period of time ranging from about 1 minute to about 15 minutes.

6. The process of claim 1 wherein the microporous adsorbent is a resin.

7. The process of claim 6 wherein the resin is a hydrophobic resin and a polymer of styrene and divinyl benzene.

8. The process of claim 1 wherein the microporous adsorbent is an activated carbon.

9. The process of claim 1 wherein the recovered aromatic components collected in the effluent comprises greater than 200 ppm total aromatics, greater than 100 ppm acetaldehyde, greater than 5 ppm diacetyl, a percentage of acetaldehyde of the total aromatics of greater than 50%, a percentage of diacetyl of the total aromatics of from 0.2% to 12.0%, and a combined percentage of acetaldehyde and diacetyl of the total aromatics of greater than 51%.

10. The process of claim 11 wherein the recovered aromatics collected in the effluent additionally comprises the following ratios:
(acetaldehyde +diacetyl)/IVA of greater than 25,
acetaldehyde/IVA of greater than 20, and
diacetyl/IVA of greater than 2.0.

11. The process of claim 9 wherein the recovered aromatic components collected in the effluent comprises an amount of total aromatics within the range of from 2,000 to 12,000 ppm, greater than 50 ppm diacetyl, greater than 1,000 ppm acetaldehyde, a percentage of acetaldehyde of the total aromatics of from 60% to 90%, a percentage of diacetyl of the total aromatics of from 1.0% to 7.5% and a combined percentage of acetaldehyde and diacetyl of the total aromatics of greater than 61.0%.

12. The process of claim 11 wherein the recovered aromatics collected in the effluent additionally comprises the following ratios:
(acetaldehyde +diacetyl)/IVA of from 150 to 1,000,
and acetaldehyde/IVA of from 125 to 1,000.

* * * * *